United States Patent
Islam et al.

(10) Patent No.: US 11,102,775 B2
(45) Date of Patent: Aug. 24, 2021

(54) RESOURCE BLOCK CHANNELIZATION FOR OFDM-BASED NUMEROLOGIES

(71) Applicant: Huawei Technologies Co., Ltd., Shenzhen (CN)

(72) Inventors: Toufiqul Islam, Ottawa (CA); Kelvin Kar Kin Au, Kanata (CA); Jianglei Ma, Ottawa (CA); Liqing Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 49 days.

(21) Appl. No.: 14/952,983

(22) Filed: Nov. 26, 2015

(65) Prior Publication Data
US 2017/0156140 A1    Jun. 1, 2017

(51) Int. Cl.
*H04W 72/04* (2009.01)
*H04L 27/26* (2006.01)
*H04L 5/00* (2006.01)

(52) U.S. Cl.
CPC ....... *H04W 72/0446* (2013.01); *H04L 5/0044* (2013.01); *H04L 5/0064* (2013.01); *H04L 5/0091* (2013.01); *H04L 5/0007* (2013.01); *H04L 5/0039* (2013.01); *H04L 27/2601* (2013.01)

(58) Field of Classification Search
CPC .. H04L 27/2601; H04W 4/005; H04W 72/04; H04W 72/0406; H04W 72/0446
See application file for complete search history.

(56) References Cited

U.S. PATENT DOCUMENTS

| 8,270,435 | B2 | 9/2012 | Olszewski |
| 8,730,894 | B2 | 5/2014 | Sadri et al. |
| 2004/0165524 | A1 | 8/2004 | Chen et al. |
| 2007/0133701 | A1 | 6/2007 | Iwami |
| 2010/0075686 | A1 | 3/2010 | Bhattah et al. |
| 2011/0096783 | A1 | 4/2011 | Cai et al. |
| 2011/0317647 | A1 | 12/2011 | Cho et al. |
| 2012/0069794 | A1* | 3/2012 | Kim ................. H04B 7/15542 370/315 |

(Continued)

FOREIGN PATENT DOCUMENTS

| CN | 101577857 A | 11/2009 |
| CN | 101841375 A | 9/2010 |

(Continued)

OTHER PUBLICATIONS

Xi Zhang et al. "Filtered-OFDM—Enabler for Flexible Waveform in the 5th Generation Cellular Networks", IEEE Globecom, San Diego, CA, Dec. 2015.

(Continued)

*Primary Examiner* — Awet Haile
(74) *Attorney, Agent, or Firm* — Slater Matsil, LLP (57) ABSTRACT

Systems and methods for transmitting and receiving resource blocks using OFDM-based signals are provided. The OFDM-based signal has a number of sub-bands, and employs a respective numerology in each sub-band. Each numerology has a respective subcarrier spacing and OFDM symbol duration. For a given receiver, content is mapped to resource blocks within an assigned one of the sub-bands, using the sub-carrier spacing of the sub-band.

20 Claims, 8 Drawing Sheets

(56) References Cited

U.S. PATENT DOCUMENTS

| | | | |
|---|---|---|---|
| 2012/0270537 A1* | 10/2012 | Weng | H04W 48/16 455/424 |
| 2012/0287883 A1 | 11/2012 | Kim et al. | |
| 2014/0044064 A1 | 2/2014 | Nangia et al. | |
| 2015/0334708 A1* | 11/2015 | Lee | H04L 1/00 370/329 |
| 2016/0157217 A1 | 6/2016 | Xue et al. | |
| 2016/0330734 A1 | 11/2016 | Kishiyama | |
| 2016/0352551 A1 | 12/2016 | Zhang | |
| 2017/0111930 A1* | 4/2017 | Rajagopal | H04B 7/0626 |
| 2017/0164350 A1* | 6/2017 | Sun | H04L 5/0007 |
| 2017/0264476 A1 | 9/2017 | Yang et al. | |
| 2018/0007673 A1* | 1/2018 | Fwu | H04L 27/2602 |
| 2018/0198649 A1* | 7/2018 | Lindoff | H04L 27/264 |
| 2018/0227155 A1* | 8/2018 | Khoryaev | H04L 27/2602 |
| 2018/0376474 A1* | 12/2018 | Khoryaev | H04W 76/14 |

FOREIGN PATENT DOCUMENTS

| | | |
|---|---|---|
| CN | 102113287 A | 6/2011 |
| CN | 104094549 A | 10/2014 |
| CN | 104823402 A | 8/2015 |
| EP | 2385635 A2 | 11/2011 |
| EP | 2840749 A1 | 2/2015 |
| JP | 2007159066 A | 6/2007 |
| JP | 2011504018 A | 1/2011 |
| JP | 2012503440 A | 2/2012 |
| JP | 2012518324 A | 8/2012 |
| WO | 2014124930 A1 | 8/2014 |
| WO | 2014139562 A1 | 9/2014 |

OTHER PUBLICATIONS

3rd Generation Partnership Project; Technical Specification Group Radio Access Network; Evolved Universal Terrestrial Radio Access (E-UTRA); Physical layer procedures (Release 12); 3GPP TS 36.213 V12.7.0, Sep. 2016.

XP051022842 R1-156974 MediaTek Inc.,"NB-IoT Uplink Consideration",3GPP TSG RAN WG1 Meeting #83,Anaheim, USA, Nov. 15-22, 2015,total 5 pages.

XP051022898 R1-157605 Intel Corporation,"Demodulation analysis for V2V communication",3GPP TSG RAN WG1 Meeting #83,Anaheim, USA, Nov. 15-22, 2015,total 10 pages.

XP055276435 Javad Abdoli et al.,"Filtered OFDM: A New Waveform for Future Wireless Systems",2015 IEEE 16th International Workshop on Signal Processing Advances in Wireless Communications (SPAWC),total 5 pages.

Lin, H., "Flexible Configured OFDM for 5G Air Interface", IEEE Access, The journal for rapidopen access publishing, Digital Object Identifier 10.1109/ACCESS.2015.2480749, Oct. 19, 2015, 10 Pages.

Tong, W., et al., "Enabling Technologies for 5G Air-Interface with Emphasis on Spectral Efficiency in the Presence of Very Large Number of Links", Proceedings of APCC2015, 2015 IEICE 14 SB 0087, Oct. 14-16, 2015, 4 Pages.

Schaich, F., et al., "Waveform contenders for 5G—OFDM vs. FBMC vs. UFMC", 2014 6th International Symposium on Communications, Control and Signal Processing (ISCCSP), May 2014, 4 Pages.

* cited by examiner

RESOURCE BLOCK CHANNELIZATION FOR OFDM-BASED NUMEROLOGIES

FIELD

The application relates to a system and method for wireless communications, and in particular, to channelization for a system and method that incorporates orthogonal frequency division multiplexing (OFDM) for radio link transmissions in wireless networks.

BACKGROUND

In wireless communications networks such as Long-Term Evolution (LTE) networks, OFDM transmissions use a 15 kHz spacing between two adjacent subcarriers for most applications. A 7.5 kHz subcarrier spacing was proposed for dedicated evolved Multimedia Broadcast Multicast Service (e-MBMS) service. A given transmitter transmits using one subcarrier spacing or the other. Resource block (RB) channelization involves defining resource blocks as the unit of allocation. In LTE, a respective fixed channelization is defined for each of the 15 kHz and 7.5 kHz options; the channelization for 15 kHz employs 12 subcarriers per resource block, and the channelization for 7.5 kHz employs 24 subcarriers per resource block. The resource blocks for both channelizations have 180 kHz bandwidth (BW). It would be desirable to be able to use OFDM communications in a manner that allows for a more efficient resource utilization.

SUMMARY

Systems and methods for transmitting and receiving resource blocks using OFDM-based signals are provided. The OFDM-based signal has a number of sub-bands, and employs a respective numerology in each sub-band. Each numerology has a respective subcarrier spacing and OFDM symbol duration. For a given receiver, content is mapped to resource blocks within an assigned one of the sub-bands, using the sub-carrier spacing of the sub-band.

According to one broad aspect of the present invention, there is provided a method for transmitting communications signals using orthogonal frequency division multiplexing (OFDM)-based signals, comprising: for transmissions to each receiver of a plurality of receivers, assigning a first sub-band of a plurality of sub-bands, each sub-band having an associated subcarrier spacing and OFDM symbol duration, at least two of the sub-bands having differing subcarrier spacings; for transmissions to each of the plurality of receivers, mapping content to a plurality of resource blocks within the sub-band assigned to the receiver, each resource block having a frequency dimension defined by a number of subcarriers and a time dimension defined by a number of OFDM symbols; transmitting the resource blocks in a signal having the plurality of sub-bands.

According to another broad aspect of the present invention, there is provided a method for transmitting communications signals using orthogonal frequency division multiplexing (OFDM)-based signals, comprising: channelizing content from a plurality of streams using resource blocks, each resource block having a resource block type of a plurality of resource block types; each resource block type having an associated number N of subcarriers, an associated subcarrier spacing, and a bandwidth equal to N×the subcarrier spacing, at least two of the resource blocks having different associated subcarrier spacings, such that within the plurality of resource block types, a first resource block type has a largest bandwidth that is a respective integer multiple of the bandwidth of each other resource block type.

According to another broad aspect of the present invention, there is provided a method for transmitting communications signals using orthogonal frequency division multiplexing (OFDM)-based signals, comprising: channelizing content from a plurality of streams using resource blocks, each resource block having a resource block type of a plurality of resource block types; each resource block type having an associated number N of subcarriers, an associated subcarrier spacing, and a bandwidth equal to N×the subcarrier spacing, at least two resource block types having differing associated subcarrier spacings, such that a subset of the plurality of resource block types have a common subcarrier spacing, and within the subset, a first resource block type has a largest number of subcarriers that is a respective integer multiple of the number of subcarriers in each other resource block type.

According to another broad aspect of the present invention, there is provided a method for receiving communications signals using orthogonal frequency division multiplexing (OFDM)-based signals comprising: receiving a signal having a plurality of sub-bands, each sub-band having an associated subcarrier spacing and OFDM symbol duration, at least two of the sub-bands having differing subcarrier spacings; processing the received signal to extract a particular sub-band of the plurality of sub-bands; extracting content for a receiver from resource blocks that are allocated to that receiver in the particular sub-band, each resource block having a frequency dimension defined by a number of subcarriers and a time dimension defined by a number of OFDM symbols.

According to another broad aspect of the present invention, there is provided a transmitter for transmitting communications signals using orthogonal frequency division multiplexing (OFDM)-based signals, the transmitter comprising: a plurality of transmit chains, each transmit chain configured to transmit on a respective sub-band using a respective subcarrier spacing and OFDM symbol duration, at least two of the subcarrier spacings being different; each transmit chain comprising a constellation mapper, subcarrier mapping and grouping block, IFFT and spectrum shaping filter; wherein within each transmit chain: the constellation mapper maps content for a receiver to constellation symbols; the subcarrier mapping and grouping block maps the constellation symbols produced by the constellation mapper to inputs of the IFFT so as to map the constellation symbols to a plurality of resource blocks for the receiver, each resource block having a frequency dimension defined by a number of subcarriers and a time dimension defined by a number of OFDM symbols; the IFFT receives the constellation symbols and produces an output comprising time domain samples using the respective sub-carrier spacing of the transmit chain; the spectrum shaping filter filters a spectrum at the output of the transmit chain and performs shifting to the respective sub-band of the transmit chain.

According to another broad aspect of the present invention, there is provided receiver for receiving communications signals using orthogonal frequency division multiplexing (OFDM)-based signals comprising: a signal processor for processing a received signal to extract a particular sub-band of the plurality of sub-bands from the received signal having a plurality of sub-bands, each sub-band having an associated subcarrier spacing and OFDM symbol duration, at least two of the sub-bands having differing subcarrier spacings; a FFT (Fast Fourier Transform) that converts time domain samples from an output of the signal processor to frequency domain constellation symbols; a subcarrier demapping block that processes the frequency domain constellation symbols to extract content from resource blocks that are allocated to the receiver in the particular sub-band, each resource block having a frequency dimension defined by a number of subcarriers and a time dimension defined by a number of OFDM symbols.

BRIEF DESCRIPTION OF THE DRAWINGS

Embodiments of the invention will now be described with reference to the attached drawings in which.

DETAILED DESCRIPTION

For illustrative purposes, specific embodiments will now be explained in greater detail in conjunction with the figures.

The fixed subcarrier spacing employed by LTE networks may limit applications in wireless networks, for example, in very high speed mobility scenarios (e.g., up to 500 km/h) which may incur high Doppler frequency shift, or in scenarios where high radio frequency bands are employed, such as 10 GHz bands, where phase noise may lead to large frequency shift. In such cases, the fixed 15 kHz subcarrier spacing may not be wide enough to accommodate the Doppler impact in the frequency domain. On the other hand, low cost devices employing Machine-Type Communications (MTC) or Device to Device (D2D) communications may use a narrower frequency bandwidth to enhance coverage and save energy. In such cases, subcarrier spacings can be narrower than that used in networks such as LTE. In addition, LTE may not be able to support traffic requiring very low latency, for which a shorter transmit time interval (TTI) and wider subcarrier spacing is necessary. For example, 60 kHz or 30 kHz subcarrier spacings may be better suited for low latency traffic.

Frame structures have been proposed that are flexible in terms of the use of differing numerologies. A numerology is defined in terms of at least subcarrier spacing and OFDM symbol duration, and may also be defined by other parameters such as IFFT length, TTI length, and cyclic prefix (CP) length or duration. These numerologies may be scalable in the sense that subcarrier spacings are multiples of each other as between the differing numerologies, and TTI lengths are also multiples of each other as between differing numerologies. Such a scalable design across multiple numerologies provides implementation benefits, for example scalable total OFDM symbol duration in a time division duplex (TDD) context. See also Applicant's co-pending U.S. provisional application No. 62/169,342 to Liqing Zhang et al., entitled "System and Scheme of Scalable OFDM Numerology", hereby incorporated by reference in its entirety which provides systems and methods with scalable numerologies.

Table 1 below contains an example of a flexible frame structure design with scalable numerologies in the four columns under "Frame structure". Frames can be built using one or a combination of the four scalable numerologies. For comparison purposes, in the right hand column of the table, the conventional fixed LTE numerology is shown. The first column is for a numerology with 60 kHz subcarrier spacing which also has the shortest OFDM symbol duration. This may be suitable for ultra-low latency communications, such as Vehicle-to-Any (V2X) communications. The second column is for a numerology with 30 kHz subcarrier spacing. The third column is for a numerology with 15 kHz subcarrier spacing. This numerology has the same configuration as in LTE, except there are only 7 symbols in a TTI. This may be suitable for broadband services. The fourth column is for a numerology with 7.5 kHz spacing, which also has the longest OFDM symbol duration among the four numerologies. This may be useful for coverage enhancement and broadcasting. Of the four numerologies listed, those with 30 kHz and 60 kHz subcarrier spacings are more robust to Doppler spreading (fast moving conditions), because of the wider subcarrier spacing.

In Table 1, each numerology uses a first cyclic prefix length for a first number of OFDM symbols, and a second cyclic prefix length for a second number of OFDM symbols. For example, in the first column under "Frame structure", the TTI includes 3 symbols with a cyclic prefix length of 1.04 µs followed by 4 symbols with a cyclic prefix length of 1.3 µs.

TABLE 1

Example set of Numerologies

| Parameters | Frame structure | | | | Baseline (LTE) |
| --- | --- | --- | --- | --- | --- |
| TTI Length | 0.125 ms | 0.25 ms | 0.5 ms | 1 ms | TTI = 1 ms |
| Subcarrier spacing | 60 kHz | 30 kHz | 15 kHz | 7.5 kHz | 15 kHz |
| FFT size | 512 | 1024 | 2048 | 4096 | 2048 |
| Symbol duration | 16.67 µs | 33.33 µs | 66.67 µs | 133.33 µs | 66.67 µs |

TABLE 1-continued

Example set of Numerologies

| Parameters | Frame structure | | | | Baseline (LTE) |
|---|---|---|---|---|---|
| #symbols in each TTI | 7 (3, 4) | 7 (3, 4) | 7 (3, 4) | 7 (3, 4) | 14 (2, 12) |
| CP length | 1.04 µs, 1.30 µs (32, 40 point) | 2.08 µs, 2.60 µs (64, 80 point) | 4.17 µs, 5.21 µs (128, 160 point) | 8.33 µs, 10.42 µs (256, 320 point) | 5.2 µs, 4.7 µs (160, 144 point) |
| CP overhead | 6.67% | 6.67% | 6.67% | 6.67% | 6.67% |
| BW (MHz) | 20 | 20 | 20 | 20 | 20 |

It should be understood that the specific numerologies of the example of Table 1 are for illustration purposes, and that a flexible frame structure combining other numerologies can alternatively be employed.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple user equipments (UEs). In a specific example, filtered OFDM (f-OFDM) can be employed. With f-OFDM, filtering is employed to shape the spectrum of each sub-band OFDM signal, and the sub-band OFDM signals are then combined for transmission. f-OFDM lowers out-of-band emission and improves transmission, and addresses the non-orthogonality introduced as a result of the use of different subcarrier spacings.

A channelization system and method are provided that allow satisfaction of a diverse set of use cases having a wide range quality of service (QoS) requirements, where one or multiple QoS requirements (e.g. latency and reliability for some MTC applications) can be simultaneously met in a system that supports multiple numerologies, such as described by way of example above. As part of channelization, selection of the size of the RB plays an important role in efficient resource utilization. The provided channelization in some embodiments allows matching appropriate amounts of resources to applications, thus preserving resources that could be better used in another application.

Figure 1:
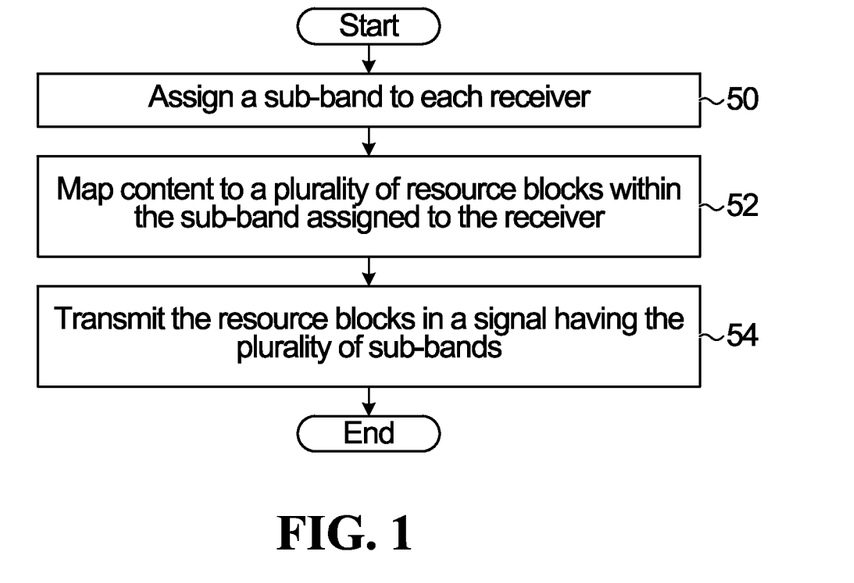
FIG. 1 is a flow chart of a method of transmitting resource blocks on an OFDM signal.

Referring now to FIG. 1, shown is a flowchart of a method for transmitting communications signals using OFDM-based signals. In block 50, for transmissions to each receiver of a plurality of receivers, a sub-band of a plurality of sub-bands is assigned. The transmissions may, for example, be from a base station to a plurality of UEs. Alternatively, the transmissions can be from UEs to the base stations. Each sub-band has an associated subcarrier spacing and OFDM symbol duration, and at least two of the sub-bands have differing subcarrier spacings. In block 52, for transmissions to each of the plurality of receivers, content is mapped to a plurality of resource blocks within the sub-band assigned to the receiver. Each resource block has a frequency dimension defined by a number of subcarriers and a time dimension defined by a number of OFDM symbols. In block 54, the resource blocks are transmitted in a signal having the plurality of sub-bands.

Various detailed examples of resource block definitions are provided below.

One or a combination of signalling channels can be transmitted by the transmitter, and be received by the receiver, to convey one or a combination of:
 a. OFDM sub-band definitions;
 b. assignment of a receiver to a sub-band;
 c. resource block types;
 d. resource block type assignments; and
 e. resource block allocation.

Figure 2:
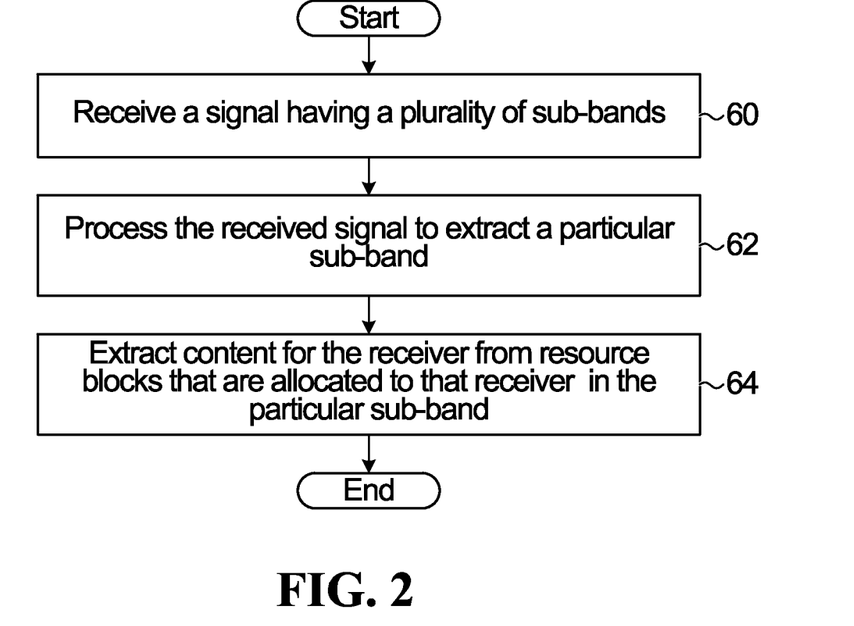
FIG. 2 is a flow chart of a method of receiving resource blocks on an OFDM signal.

Referring now to FIG. 2, shown is a flowchart of a method of receiving communications using OFDM. The communications may, for example, be received by a base station from one or more UEs, or be received by a UE from a base station. In block 60, a receiver receives a signal having a plurality of sub-bands, each sub-band having an associated subcarrier spacing and OFDM symbol duration. At least two of the sub-bands have differing subcarrier spacings. The received signal might have been generated using the method of FIG. 1, for example. In block 62, the receiver processes the received signal to extract a particular sub-band of the plurality of sub-bands. In block 64, the receiver extracts content for the receiver from resource blocks in the particular sub-band that are allocated to that receiver.

In some embodiments, the methods of FIGS. 1 and 2 employ f-OFDM.

Scalable Bandwidth

In some embodiments, for each of the OFDM sub-bands, a set of resource block types is defined having scalable bandwidths. The bandwidth of a resource block is the subcarrier spacing multiplied by the number of subcarriers. In some embodiments, the resource blocks having scalable bandwidths in the sense that a first resource block type has a largest bandwidth, and the largest bandwidth is a respective integer multiple of the bandwidth of each other resource block type.

As a specific example, for a sub-band employing a subcarrier spacing of 15 kHz, a set of resource blocks having 2, 3, 6, 18 subcarriers respectively have scalable bandwidth in the sense that 18 is an integer multiple of each of 2, 3, and 6.

In some embodiments, a set of resource blocks types with a more constrained scalability requirement is provided. In this case, the bandwidth of each resource block type is a respective integer multiple of the bandwidth of every other resource block type having a smaller bandwidth. As a specific example, for a subcarrier spacing of 15 kHz, a set of resource blocks having 2, 4, 8, 16 subcarriers respectively have scalable bandwidth in the sense that:
16 is an integer multiple of 2, 4 and 8;
8 is an integer multiple of 2 and 4; and
4 is an integer multiple of 2.

In some embodiments, a scalable bandwidth per resource block for a set of numerologies is employed, with a fixed number N of subcarriers being employed for all resource blocks.

Figure 3:
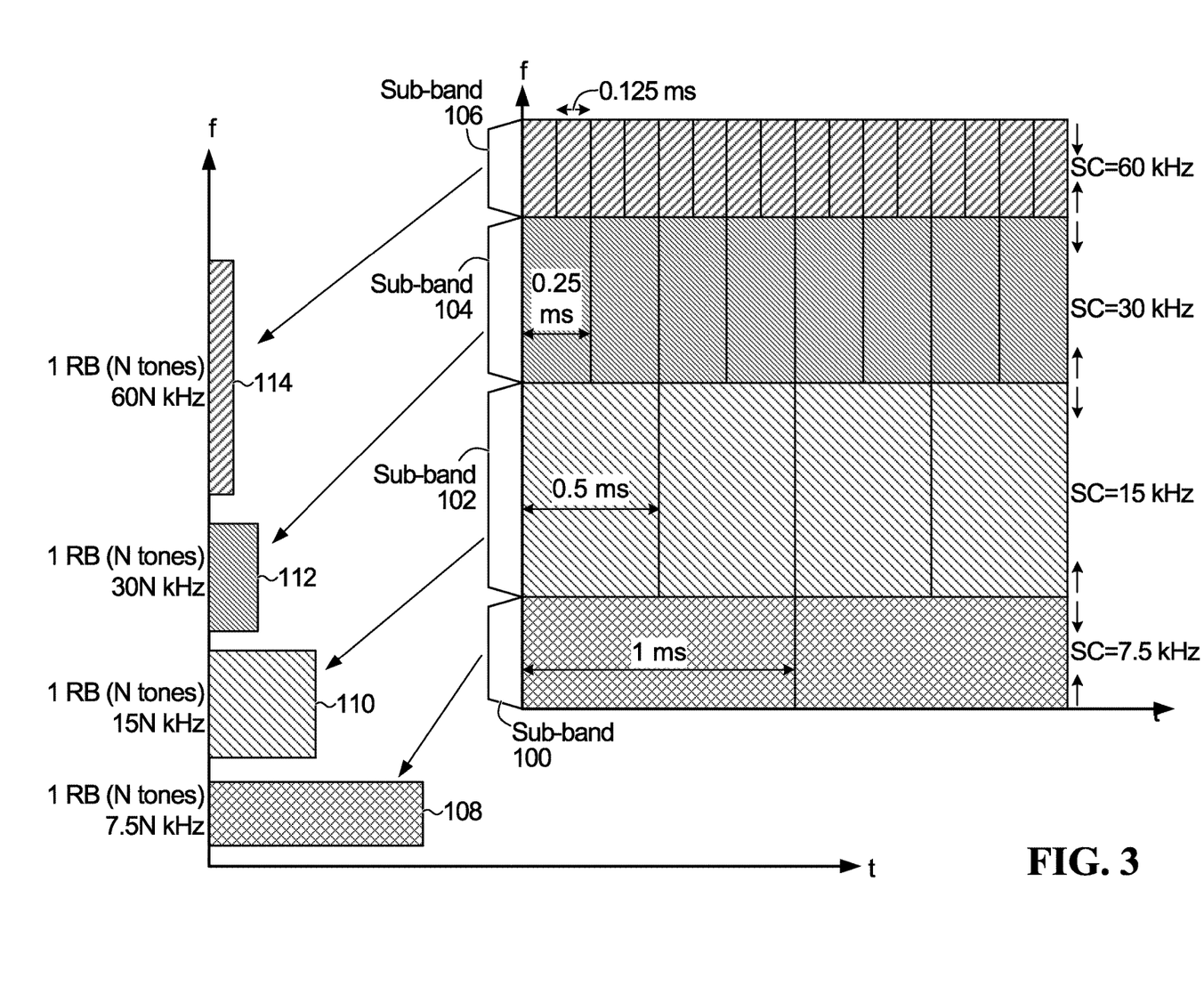
FIG. 3 shows an example of resource block configuration with scalable bandwidth and a fixed number of subcarriers.

Referring now to FIG. 3, shown is an example of resource block configuration with scalable bandwidth and fixed N. An available bandwidth is divided between four OFDM sub-bands 100, 102, 104, 106. In sub-band 100, a 7.5 kHz subcarrier spacing is used together with a 1 ms TTI. In sub-band 102, a 15 kHz subcarrier spacing is used together with a 0.5 ms TTI. In sub-band 104, a 30 kHz subcarrier spacing is used together with a 0.25 ms TTI. In sub-band 106, a 60 kHz subcarrier spacing is used together with a 0.125 ms TTI. For this example, a fixed, common number of OFDM symbols is transmitted per TTI for all of the numerologies. Resource blocks with a fixed number of subcarriers for each of the sub-bands are indicated at 108, 110, 112, 114. Note that the frequency dimension for the depicted resource blocks is not of the same scale as for the sub-bands. Thus, the bandwidths of the resource blocks vary across numerologies; the bandwidths of the four depicted resource blocks are 7.5N kHz, 15N kHz, 30N kHz, and 60N kHz, respectively. These resource blocks have scalable bandwidths in the sense that the bandwidth of each resource block type is a respective integer multiple of the bandwidth of every other resource block type having a smaller bandwidth. N can be fixed at any desired number. For example, N might be fixed at 12 for all resource blocks.

The number of resource blocks that can be accommodated in the frequency direction in a given sub-band is a function of the subcarrier spacing, the number of subcarriers per resource block, the sub-band bandwidth, and a guard band within the sub-band bandwidth which is not used for resource blocks. For example, with a sub-band bandwidth of 20 MHz, a 10% guard band, and a fixed N=12 subcarriers per resource block, and a subcarrier spacing of 60 kHz, the sub-band could accommodate 25 resource blocks in the frequency direction.

A specific example is provided for N=12 in Table 2 below. In this example, a 20 MHz sub-band bandwidth is employed for each sub-band. The 60 kHz numerology can fit a smaller number of RBs within the sub-band bandwidth compared to smaller subcarrier spacing numerologies such as 15 kHz or 7.5 kHz.

TABLE 2

Scalable BW Example (fixed number N = 12 of subcarriers)

| Parameters | Subcarrier spacing | | | |
|---|---|---|---|---|
| | 60 kHz | 30 kHz | 15 kHz | 7.5 kHz |
| Number of subcarriers | 12 | 12 | 12 | 12 |
| RB BW (kHz) | 720 | 360 | 180 | 90 |
| BW (MHz) | 20 | 20 | 20 | 20 |
| Number of RBs (10% GB) | 25 | 50 | 100 | 200 |

For this embodiment, where N is fixed across all numerologies, selection of a numerology at the same time assigns RB bandwidth and channelization. In this case, there would be no need for separate signalling for channelization.

In an example use case, resource blocks with 60 kHz subcarrier spacing and N=12 can be used for mobile broadband (MBB) in vehicles, and resource blocks with 15 kHz subcarrier spacing and N=12 can be used for broadband access in dense areas.

Tables 3 and 4 below provide further examples of channelization with scalable bandwidth and N=6 and N=24 respectively.

TABLE 3

Another example with of channelization with scalable BW with N = 6

| Parameters | Subcarrier spacing | | | |
|---|---|---|---|---|
| | 60 kHz | 30 kHz | 15 kHz | 7.5 kHz |
| Number of subcarriers N | 6 | 6 | 6 | 6 |
| RB BW (kHz) | 360 | 180 | 90 | 45 |
| BW (MHz) | 20 | 20 | 20 | 20 |
| Number of RBs (10% GB) | 50 | 100 | 200 | 400 |

TABLE 4

Another example with of channelization with scalable BW with N = 24

| Parameters | Subcarrier spacing | | | |
|---|---|---|---|---|
| | 60 kHz | 30 kHz | 15 kHz | 7.5 kHz |
| Number of subcarriers | 24 | 24 | 24 | 24 |
| RB BW (kHz) | 1440 | 720 | 360 | 180 |
| BW (MHz) | 20 | 20 | 20 | 20 |
| Number of RBs (10% GB) | 12 | 25 | 50 | 100 |

There may be other advantages for embodiments with a fixed number of subcarriers per resource block. In this case, resource blocks can be self-contained across different numerologies from an uplink control signalling perspective, meaning that a unit of uplink control signaling can fit inside a single resource block for all the numerologies with the fixed number of subcarriers per resource block. A unit of uplink control signalling is transmitted in a dedicated time/frequency resource, sometimes called a control region. A specific example of an uplink control region is an LTE Physical Uplink Control Channel (PUCCH) control region. One LTE PUCCH control region fits inside a resource block in an LTE context (12 subcarriers times 7 symbols).

For example, a same resource block-based sequence design can be used for all numerologies as long as all resource blocks have the same value of N. For example, a same Zadoff-Chu (ZC) sequence length could be used for a PUCCH on all numerologies.

The number of control signals multiplexing in one uplink control region (e.g., in terms of resource blocks) can be the same for all numerologies.

Differing N, Fixed Resource Block Bandwidth

In some embodiments, the bandwidth of all resource blocks is set to a fixed value for all numerologies. Having set that value, the number of subcarriers per resource block is dictated by the subcarrier spacing.

Figure 4:
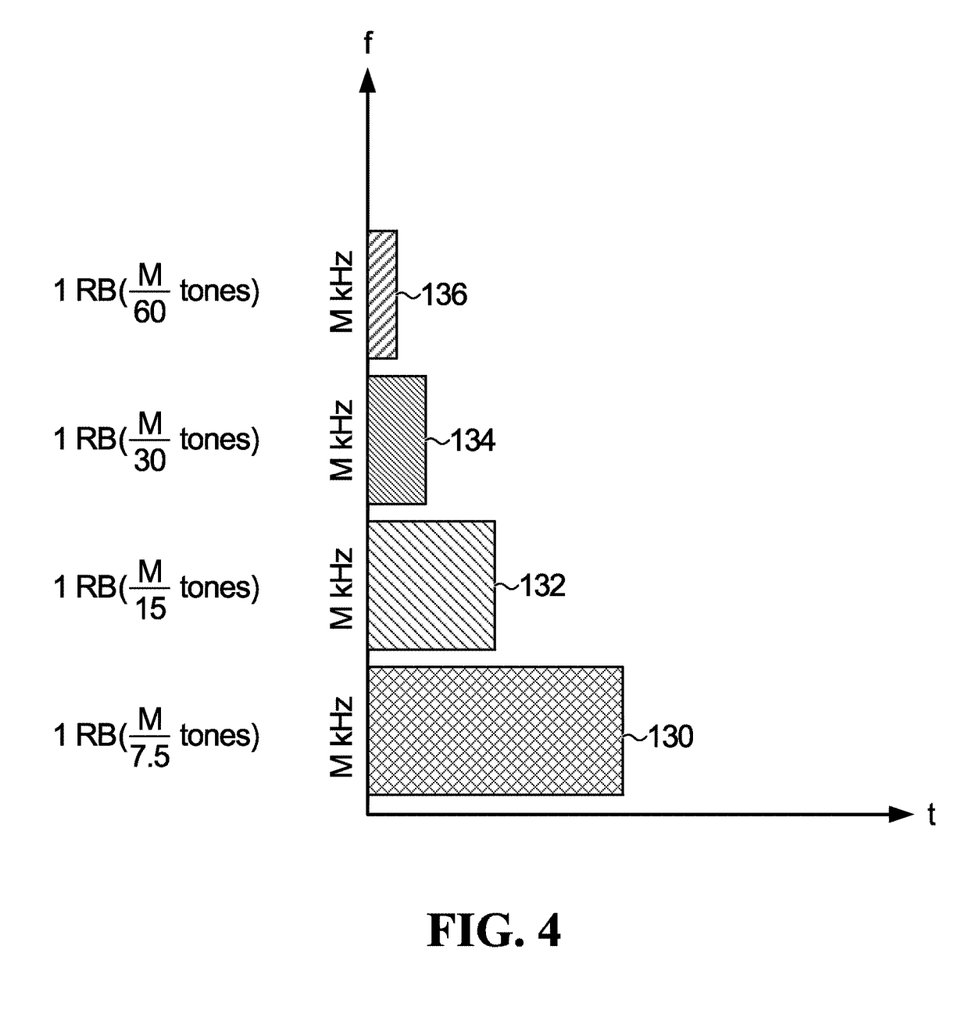
FIG. 4 shows an example of resource block configuration with fixed resource block bandwidth.

An example is depicted in FIG. 4. Here, the resource block bandwidth is fixed at M kHz. The number of subcarriers per resource block is defined by N=M/SC, where SC is the subcarrier spacing.

In a specific example, M might be one of 90, 180, 360, 720 kHz, and SC may be one of 7.5, 15, 30, 60 kHz. M may optionally be evenly divisible by SC.

A resource block 130 for the 7.5 kHz numerology has M/7.5 subcarriers. A resource block 132 for the 15 kHz numerology has M/15 subcarriers. A resource block 134 for the 30 kHz numerology has M/30 subcarriers. A resource block 136 for the 60 kHz numerology has M/60 subcarriers.

For example, if the fixed resource block bandwidth M=180 kHz, a resource block with 60 kHz subcarrier spacing has 3 subcarriers, whereas a resource block with 7.5 kHz subcarrier spacing has 24 subcarriers. Resource block parameters for this example are provided in Table 5 below.

Use cases like ultra-high reliability and ultra-low latency data traffic may adopt 60 kHz SC, but choose N<12 due to smaller payload.

In some embodiments, a set of resource block types are defined having the same bandwidth across different numerologies. The subcarrier spacings of the different numerologies are such that resource block types have a scalable number of subcarriers. In some embodiments, the number of subcarriers is scalable in the sense that a number of subcarriers in a resource block type having a largest number of subcarriers is a respective integer multiple of the number of subcarriers in every other resource block type.

In other embodiments, the number of subcarriers is scalable in the sense that each resource block type has a number of subcarriers that is a respective integer multiple of the number of subcarriers in each resource block type having a smaller number of subcarriers than that resource block type. An example of this is depicted in Table 5 below, in which the resource blocks all have a fixed bandwidth of 180 kHz.

TABLE 5

Scalable Number of subcarriers per RB

| Parameters | Subcarrier spacing | | | |
| --- | --- | --- | --- | --- |
| | 60 kHz | 30 kHz | 15 kHz | 7.5 kHz |
| Number of subcarriers | 3 | 6 | 12 | 24 |
| RB BW (kHz) | 180 | 180 | 180 | 180 |
| BW (MHz) | 20 | 20 | 20 | 20 |
| Number of RBs (10% GB) | 100 | 100 | 100 | 100 |

Co-Existence of Different Values of N

In some embodiments, a single value of N is fixed for all numerologies. In other embodiments, a respective fixed value of N is defined for each numerology. In another embodiment, in order to improve efficiency, a more flexible channelization is provided to allow different RB sizes to deliver differing payload sizes to different receivers. With this embodiment, differing values of N can be configured within a given numerology. In some cases, a set of resource block types for a given numerology are defined that have scalable N (in either of the two senses described above).

Figure 5:
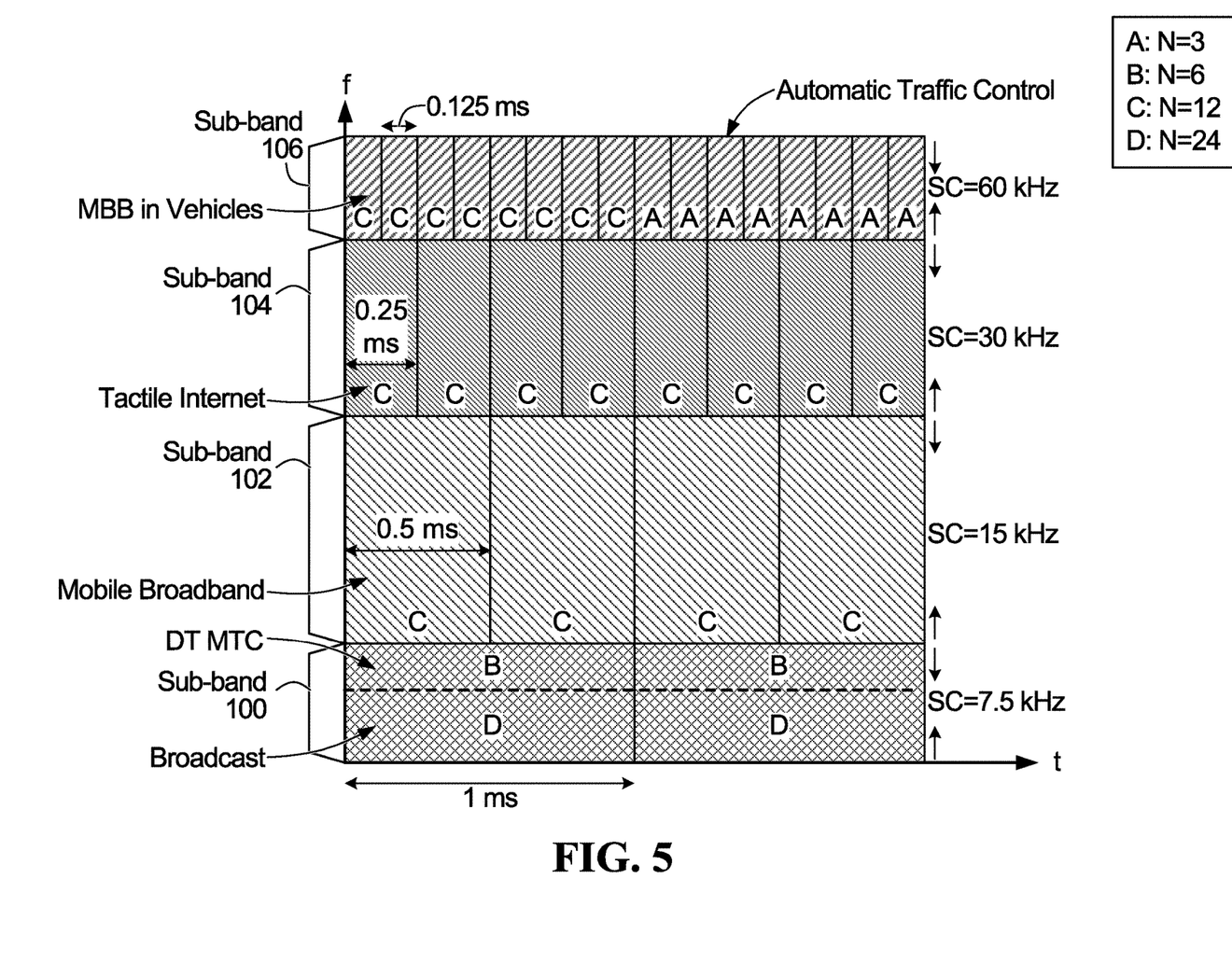
FIG. 5 shows an example of resource block configuration featuring the co-existence of different numbers of subcarriers.

Referring to FIG. 5, shown is another example in which sub-bands 100, 102, 104, 106 as defined previously with reference to FIG. 3 are used. With this embodiment, N can be varied across time and/or frequency within a sub-band. In some embodiments, the variation in N across time and/or frequency is based on changes in traffic types or channel control requirements. In the Figure, "A" means channelization using RBs with N=3 subcarriers. "B" means channelization using RBs with N=6 subcarriers. "C" means channelization using RBs with N=12 subcarriers. "D" means channelization using RBs with N=24 subcarriers. In the illustrated example:

for sub-band 100, part of the sub-band is channelized with resource blocks having N=6 subcarriers and part of the sub-band is channelized with resource blocks having N=24 subcarriers. This is an example of variation of N across frequency within a sub-band;

sub-band 102 is channelized with resource blocks having N=12 subcarriers;

sub-band 104 is channelized with resource blocks having N=12 subcarriers; and sub-band 106 is channelized with resource blocks having N=12 subcarriers for 8 TTIs, and then changes to N=3 subcarriers. This represents an example of varying N across time within a sub-band.

The different channelizations within the different OFDM sub-bands of FIG. 5 can be employed for various use cases. Specific examples are depicted in FIG. 5 as follows:

Channelization C might be employed within the OFDM sub-band 106 with subcarrier spacing 60 kHz for mobile broadband in vehicles.

Channelization A might be employed within the OFDM sub-band 106 with subcarrier spacing 60 kHz for automatic traffic control.

Channelization C might be employed with an OFDM sub-band 104 with subcarrier spacing 30 kHz for tactile internet.

Channelization C might be employed within OFDM sub-band 102 with subcarrier spacing 15 kHz for mobile broadband.

Channelization B might be employed within OFDM sub-band 100 with subcarrier spacing 7.5 kHz for delay tolerant (DT) MTC.

Channelization D might be employed also within OFDM sub-band 100 with subcarrier spacing 7.5 kHz for broadcast transmission. In summary, FIG. 5 shows an example of the co-existence of different values of N (i.e., RB sizes) across different numerologies, and also shows an example of multiple channelizations within a numerology. This would be useful where there are different applications that would benefit from being mapped to the same numerology, but with different N, thereby providing different payload size.

Figure 6A:
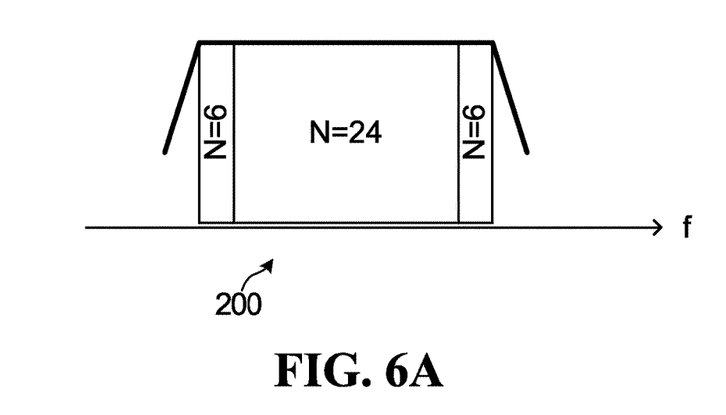
FIGS. 6A, 6B and 6C depict further examples of simultaneous co-existence of different numbers of subcarriers per resource block for the same numerology.

As detailed above, in some embodiments, different values of N can be used for resource blocks that are simultaneously transmitted using the same numerology. The channelization for sub-band 100 of FIG. 5 is an example of this in which the resource blocks are contiguous and synchronously allocated within a common sub-band, and as such can be generated by the same inverse fast Fourier transform (IFFT). Refer also to the example 200 of FIG. 6A, which depicts synchronous contiguous allocation of resource blocks with N=6, N=24, and N=6 respectively. This use case might be appropriate for downlink transmissions to multiple receivers.

In some embodiments, where different values of N are used for resource blocks being transmitted simultaneously using the same numerology within a single sub-band, the resource blocks for each value of N form a respective group of resource blocks that are contiguously arranged in frequency. Each set of contiguously arranged resource blocks can be viewed as a respective logical channel. This is the case for the example of FIG. 5 where a first set of contiguous resource blocks can be transmitted in the part of sub-band 100 as a logical channel for DT MTC traffic, and a second set of contiguous resource blocks can be transmitted in the part of the OFDM sub-band 100 as a logical channel for broadcast traffic.

In some embodiments, where different values of N are used for resource blocks being transmitted simultaneously using the same numerology, a set of resource blocks using a given value of N are not necessarily all contiguously arranged in frequency within a given sub-band. Alternatively, they can be arranged in a distributed fashion within the sub-band. The collection of distributed resource blocks can still be viewed as a logical channel used for a particular traffic type. As an example, in a sub-band used for a 15 kHz numerology and having 300 subcarriers, resource blocks can be arranged having sizes that alternate between 10 subcarriers and 20 subcarriers, with the resource blocks having 10 subcarriers collectively being a first logical channel, and the resource blocks having 20 subcarriers collectively being a second logical channel.

Figure 6B:
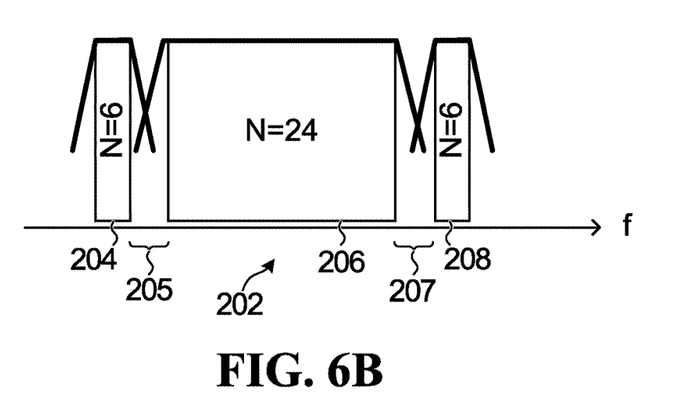

In some embodiments, different values of N can be used for resource blocks that are simultaneously transmitted for the same numerology, but using asynchronous allocation within contiguous sub-bands. FIG. 6B shows an example of this at 202. The three contiguous sub-bands 204, 206, 208 (contiguous in the sense that there is no other intervening sub-band) have the same numerology, and are each generated by respective IFFTs. There is a guard band 205 between the sub-bands 204 and 206, and another guard band 207 between sub-bands 206 and 208. For this example, the channelization on sub-bands 204, 208 has N=6, and the channelization for sub-band 206 has N=24. This use case may be more appropriate where multiple UEs are transmitting on the uplink.

Figure 6C:
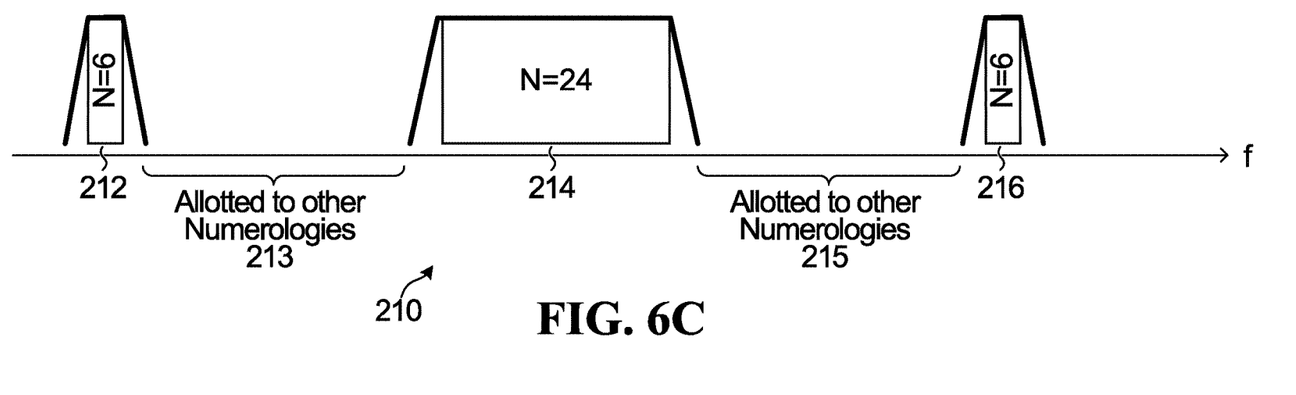

In some embodiments, different values of N can be used for resource blocks that are simultaneously transmitted using the same numerology, but using asynchronous and non-contiguous allocation. FIG. 6C shows an example of this at 210. There are three non-contiguous sub-bands 212, 214, 216 (non-contiguous in the sense that there are intervening sub-bands) that have the same numerology, but with each generated by respective IFFTs, and there are spaces 213, 215 between the sub-bands for sub-bands to be allotted to other numerologies. For this example, the channelization on sub-bands 212, 216 has N=6, and the channelization for sub-band 214 has N=24.

For these examples, larger payload resource blocks, for example N=24, can be used for some applications such as broadcast services, and smaller payload resource blocks, for example N=3, can be used for other applications, such as massive low cost low power MTC at the same time.

Providing resource block channelizations with differing N, including resource blocks with larger N to allow for larger payload, may offer an advantage in terms of reference symbol overhead compared to allocating a larger number of resource blocks with smaller N when larger payload capacity is required.

Smaller bandwidth resource blocks allow a better utilization of resources by allowing the smaller resource blocks to be used for smaller payloads. For example, for a low power UE that has only a small payload to transmit, using an RB with a large BW may not be a cost-effective solution. The particular UE can be better served with a smaller RB.

Figure 7A:
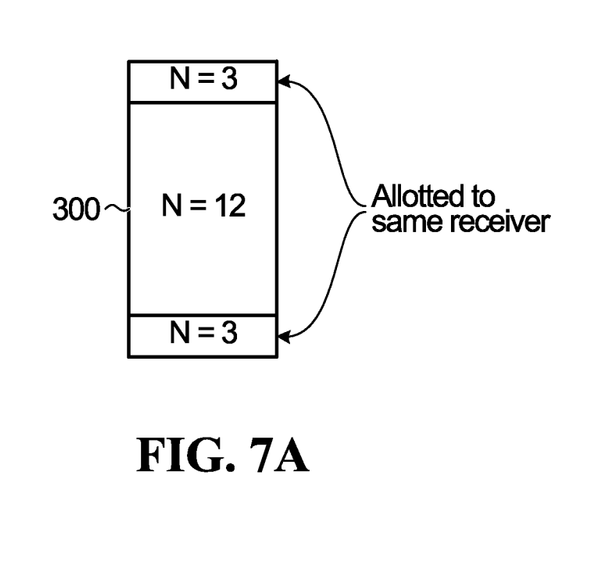
FIGS. 7A and 7B are two examples of resource block configuration in which resource blocks with differing numbers of subcarriers are used within the same numerology.

In some embodiments, frequency diversity is provided for some transmissions by repeating resource blocks at differing frequencies. For example, for a critical service requiring low latency and high reliability, one RB of data with N=3 can be repeated in multiple locations within a sub-band. An example of this is depicted in FIG. 7A at 300, where two regions each containing one or more resource blocks with N=3 are allotted to the same receiver, and separated by a region containing one or more resource blocks with N=12.

Figure 7B:
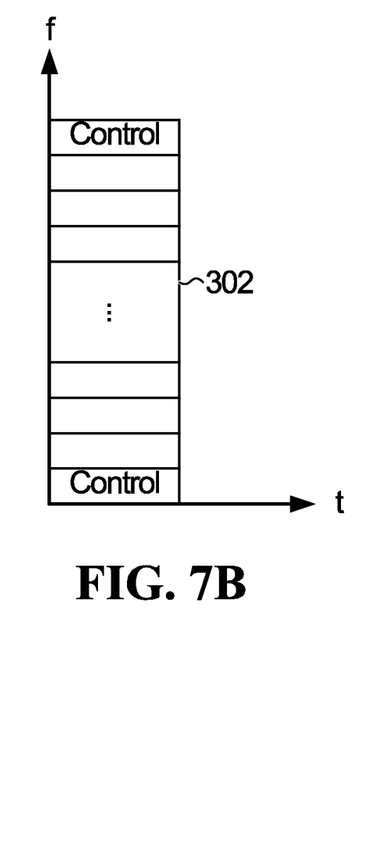

Within a given sub-band, or part of a given sub-band, N can be configured to provide a required control channel capacity that ensures efficient resource utilization. Control channel signaling may be repeated on multiple frequencies, providing frequency diversity for the resource blocks assigned to a given control channel signaling. For example, for a considered numerology, certain resource blocks (e.g., those near the edge of a sub-band) can be used for a control channel on the uplink. The value of N can be adapted accordingly to obtain a suitable channelization for the control channel to multiplex a certain number of channel quality indicators (CQIs), for example of a set of UEs. The same control channel can be repeated for frequency diversity. This approach can be used for other types of feedback signaling, for example demodulation reference symbols (DmRS), acknowledgement/negative acknowledgement (ACK/NACK). An example is depicted in FIG. 7B at 302, where two resource blocks at the edge of a sub-band are allotted to a control channel.

Figure 8A:
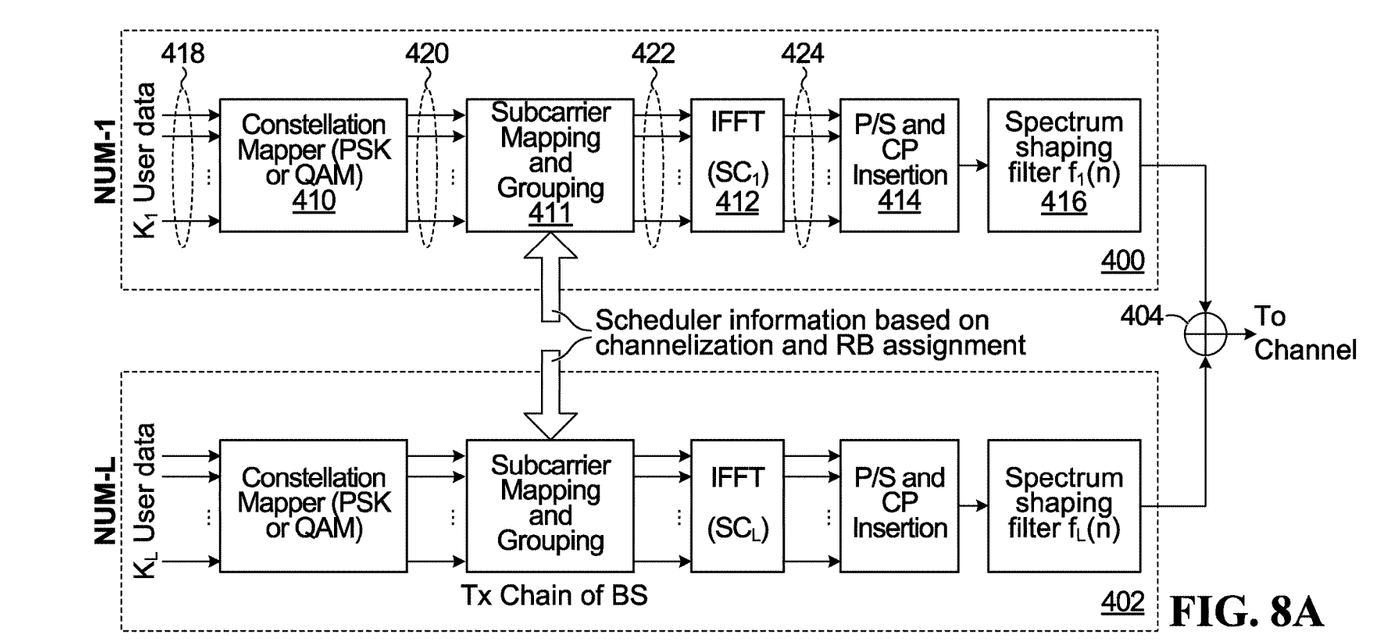
FIG. 8A is a simplified block diagram of a transmitter that can be used to perform channelization.

Referring now to FIG. 8A, shown is an example simplified block diagram of part of a transmitter that can be used to perform channelization as described above. In this example, there are L supported numerologies, where L>=2.

Figure 8B:
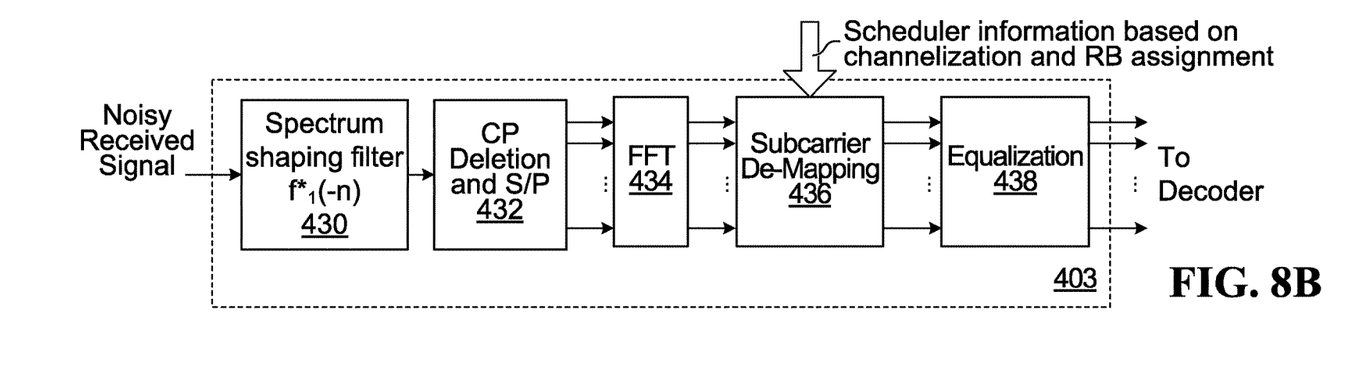
FIG. 8B is a simplified block diagram of a receiver that can be used to receive channelized signals.

For each numerology, there is a respective transmit chain 400, 402. FIG. 8A shows simplified functionality for the first and Lth numerology; the functionality for other numerologies would be similar. Also shown in FIG. 8B is simplified functionality for a receive chain 403 for a receiver operating using the first numerology.

The transmit chain 400 for the first numerology includes a constellation mapper 410, subcarrier mapping and grouping block 411, IFFT 412 with subcarrier spacing $SC_1$, pilot symbol and cyclic prefix insertion 414, and spectrum shaping filter 416. In operation, constellation mapper 410 receives user data (more generally, user content containing data and/or signalling) for $K_1$ users, where $K_1>=1$. The constellation mapper 410 maps the user data for each of the $K_1$ users to a respective stream of constellation symbols and outputs this at 420. The number of user bits per symbol depends on the particular constellation employed by the constellation mapper 410. In the example of quadrature amplitude modulation (QAM), 2 bits from for each user are mapped to a respective QAM symbol.

For each OFDM symbol period, the subcarrier mapping and grouping block 411 groups and maps the constellation symbols produced by the constellation mapper 410 to up to P inputs of the IFFT 412 at 422. The grouping and mapping is performed based on scheduler information which in turn is based on channelization and resource block assignment, in accordance with a defined resource block definition and allocation for the content of the $K_1$ users being processed in transmit chain 400. P is the size of the IFFT 412. Not all of the P inputs are necessarily used for each OFDM symbol period. The IFFT 412 receives up to P symbols, and outputs P time domain samples at 424. Following this, in some implementations, time domain pilot symbols are inserted and a cyclic prefix is added in block 414. The spectrum shaping filter 416 applies a filter $f_1(n)$ which limits the spectrum at the output of the transmit chain 400 to prevent interference with the outputs of other transmit chains such as transmit chain 402. The spectrum shaping filter 416 also performs shifting of each sub-band to its assigned frequency location.

The functionality of the other transmit chains, such as transmit chain 402 is similar. The outputs of all of the transmit chains are combined in a combiner 404 before transmission on the channel.

FIG. 8B shows a simplified block diagram of a receive chain for a user equipment operating with the first numerology depicted at 403. In some embodiments, a given user equipment is permanently configured to operate with a particular numerology. In some embodiments, a given user equipment operates with a configurable numerology. In either case, flexible resource block definitions are supported by the user equipment. The receive chain 403 includes spectrum shaping filter 430, cyclic prefix deletion and pilot symbol processing 432, fast Fourier transform (FFT) 434, subcarrier de-mapping 436 and equalizer 438. Each element in the receive chain performs corresponding reverse operations to those performed in the transmit chain. The receive chain for a user equipment operating with another numerology would be similar.

The subcarrier mapping and grouping block 411 of FIG. 8A groups and maps the constellation symbols based on the resource block definition(s) and scheduling. Once a resource block definition for a given user is established, scheduling is used to decide where in time and frequency the user's resource blocks will be transmitted.

Figure 9A:
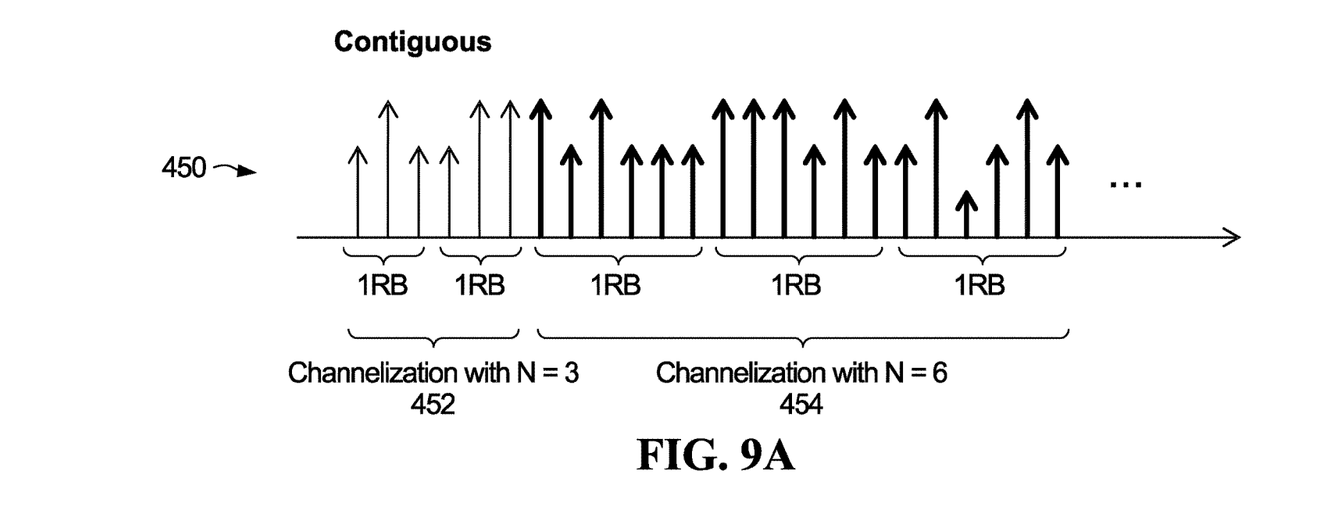
FIGS. 9A and 9B depict two further examples of how constellation symbols might be grouped and mapped to 24 inputs of an inverse fast Fourier transform (IFFT).

Referring now to FIG. 9A, shown is a first specific example of how constellation symbols might be grouped and mapped to 24 of the inputs of the IFFT. In this example, generally indicated at 450, some constellation symbols are mapped to a contiguous set of resource blocks 452 with N=3, and some constellation symbols are mapped to a contiguous set of resource blocks 454 with N=6.

Figure 9B:
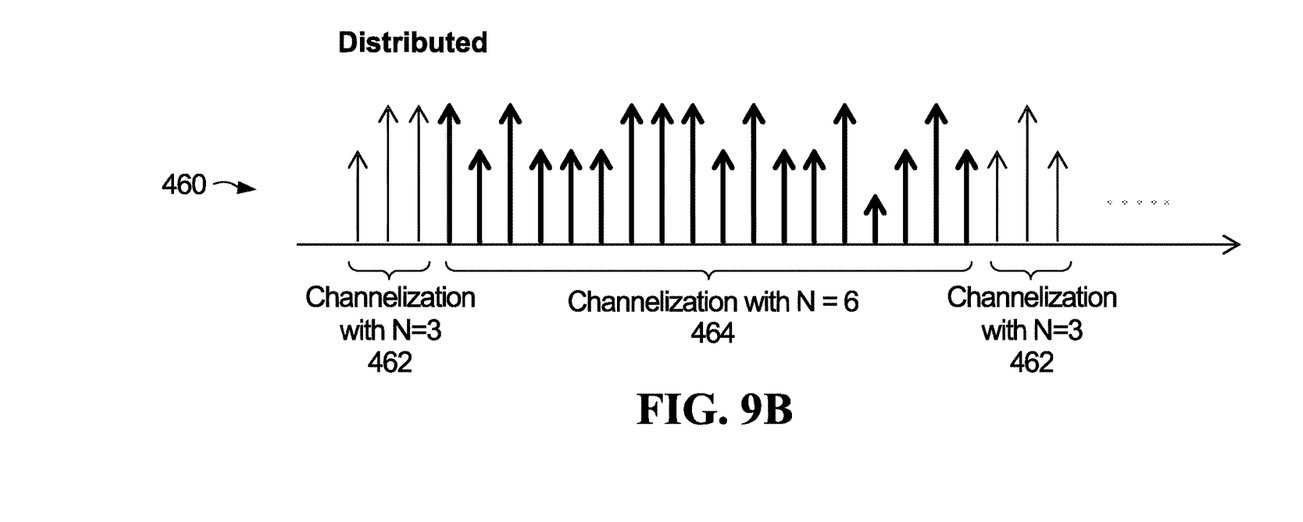

FIG. 9B shows a second specific example of how constellation symbols might be grouped and mapped to 24 of the inputs of the IFFT. In this example, generally indicated at 460, some of the constellation symbols are mapped to a non-contiguous set of resource blocks 462 with N=3, and some constellation symbols are mapped to a contiguous set of resource blocks 464 with N=6.

Although the present invention has been described with reference to specific features and embodiments thereof, it is evident that various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, it will be appreciated that any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method for wireless communication using orthogonal frequency division multiplexing (OFDM)-based signals performed by a base station, comprising:
    in a first sub-band of a carrier, transmitting, by the base station, a first downlink sub-band OFDM signal of an OFDM-based signal in a plurality of first resource blocks associated with a first subcarrier spacing; and
    in a second sub-band of the carrier, transmitting, by the base station, a second downlink sub-band OFDM signal of the OFDM-based signal in a plurality of second resource blocks associated with a second subcarrier spacing, wherein the first subcarrier spacing is one of 30 kHz or 60 kHz, wherein the second subcarrier spacing is one of 30 kHz or 60 kHz, wherein the first downlink sub-band OFDM signal and the second downlink sub-band OFDM signal are simultaneously transmitted by a transmitter of the base station, and wherein the first subcarrier spacing is different from the second subcarrier spacing,
    wherein a first number of subcarriers in each of the first resource blocks having the first subcarrier spacing of 30 kHz or 60 kHz is 24, and wherein a second number of subcarriers in each of the second resource blocks is one of 3, 6, or 12.

2. The method of claim 1, wherein:
    the each of the first resource blocks has a first bandwidth;
    the each of the second resource blocks has a second bandwidth; and
    the first bandwidth is an integer multiple of the second bandwidth.

3. The method of claim 1, further comprising:
    in a third sub-band, transmitting a third downlink sub-band OFDM signal of the OFDM-based signal in a plurality of third resource blocks having associated with a third subcarrier spacing; and
    in a fourth sub-band, transmitting a fourth downlink sub-band OFDM signal of the OFDM-based signal in a plurality of fourth resource blocks having associated with a fourth subcarrier spacing different from the third subcarrier spacing,
    a bandwidth of each of the first resource blocks, the second resource blocks, the third resource blocks, and the fourth resource blocks being an integer multiple of a bandwidth of every other resource block having a smaller bandwidth.

4. The method of claim 3, wherein a number of subcarriers in each of the third resource blocks and the fourth resource blocks is 12.

5. The method of claim 1, wherein:
    the plurality of first resource blocks are a plurality of contiguous first resource blocks; and
    the plurality of second resource blocks are a plurality of contiguous second resource blocks.

6. A method for wireless communication using orthogonal frequency division multiplexing (OFDM)-based signals, comprising:

receiving an indication of:
a first assignment specific to a UE receiving the indication of a first sub-band of a plurality of sub-bands of a carrier, and
a first subcarrier spacing specific to the UE and OFDM symbol duration specific to the UE associated with the first sub-band, wherein the plurality of sub-bands of the carrier comprises a second sub-band associated with a second subcarrier spacing, wherein the first subcarrier spacing is one of 30 kHz or 60 kHz, wherein the second subcarrier spacing is one of 30 kHz or 60 kHz, and wherein the second subcarrier spacing is different from the first subcarrier spacing; and
communicating first downlink data in at least one first resource block within the first sub-band, each resource block of the at least one first resource block having a frequency dimension defined by 24 subcarriers and having the first subcarrier spacing of 30 kHz or 60 kHz, wherein the first downlink data is simultaneously communicated with second downlink data in at least one second resource block within the second sub-band.

7. The method of claim 6, further comprising:
receiving one or more combinations of signaling by a receiver, the signaling comprising one or more of:
OFDM sub-band definitions including a sub-carrier-spacing and cyclic prefix type;
assignment of the receiver to a sub-band; or
resource block allocation.

8. A transmitter for transmitting communications signals using orthogonal frequency division multiplexing (OFDM)-based signals, the transmitter comprising:
a first transmit chain configured to transmit, in a first sub-band of a carrier, a first downlink sub-band OFDM signal of an OFDM-based signal in a plurality of first resource blocks associated with a first subcarrier spacing; and
a second transmit chain configured to transmit, in a second sub-band of the carrier, a second downlink sub-band OFDM signal of the OFDM-based signal in a plurality of second resource blocks associated with a second subcarrier spacing, wherein the first subcarrier spacing is one of 30 kHz or 60 kHz and the second subcarrier spacing is one of 30 kHz or 60 kHz, wherein the first downlink sub-band OFDM signal and the second downlink sub-band OFDM signal are simultaneously transmitted by the transmitter, and wherein the first subcarrier spacing is different from the second subcarrier spacing,
wherein a first number of subcarriers in each of the first resource blocks having the first subcarrier spacing of 30 kHz or 60 kHz is 24, and wherein a second number of subcarriers in each of the second resource blocks is one of 3, 6, or 12.

9. The transmitter of claim 8, wherein:
the each of the first resource blocks has a first bandwidth;
the each of the second resource blocks has a second bandwidth; and
the first bandwidth is an integer multiple of the second first bandwidth.

10. The transmitter of claim 8, further comprising:
a third transmit chain configured to transmit, in a third sub-band, a third downlink sub-band OFDM signal of the OFDM-based signal in a plurality of third resource blocks associated with a third subcarrier spacing; and
a fourth transmit chain configured to transmit, in a fourth sub-band, a fourth downlink sub-band OFDM signal of the OFDM-based signal in a plurality of fourth resource blocks associated with a fourth subcarrier spacing different from the third subcarrier spacing,
a bandwidth of each of the first resource blocks, the second resource blocks, the third resource blocks, and the fourth resource blocks being an integer multiple of a bandwidth of every other resource block having a smaller bandwidth.

11. The transmitter of claim 10, wherein a number of subcarriers in each of the third resource blocks and the fourth resource blocks is 12.

12. The transmitter of claim 10, wherein:
the plurality of first resource blocks are a plurality of contiguous first resource blocks; and
the plurality of second resource blocks are a plurality of contiguous second resource blocks.

13. A base station comprising the transmitter of claim 8.

14. A user equipment (UE) for wireless communication using orthogonal frequency division multiplexing (OFDM)-based signals, the UE comprising:
a processor; and
a receiver configured to:
receive an indication of
a first assignment specific to the UE of a first sub-band of a plurality of sub-bands of a carrier, and a first subcarrier spacing specific to the UE and OFDM symbol duration specific to the UE associated with the first sub-band, wherein the plurality of sub-bands of the carrier comprises a second sub-band associated with a second subcarrier spacing, wherein the first subcarrier spacing is one of 30 kHz or 60 kHz, wherein the second subcarrier spacing is one of 30 kHz or 60 kHz, and wherein the second subcarrier spacing is different from the first subcarrier spacing; and
a transmitter configured to transmit receive first downlink data in at least one first resource block within the first sub-band, each resource block of the at least one first resource block having a frequency dimension defined by 24 subcarriers and having the first subcarrier spacing of 30 kHz or 60 kHz, wherein the first downlink data is simultaneously transmitted with second downlink data in at least one second resource block within the second sub-band.

15. The UE of claim 14, wherein:
the receiver is further configured to:
receive one or more combinations of signaling by the receiver, the signaling comprising one or more of:
OFDM sub-band definitions including a sub-carrier-spacing and cyclic prefix type;
assignment of the receiver to a sub-band; or
resource block allocation.

16. An apparatus for transmitting communications signals using orthogonal frequency division multiplexing (OFDM)-based signals, the apparatus comprising:
a transmitter;
a processor; and
a non-transitory memory including instructions that, when executed by the processor, cause the transmitter to:
transmit, in a first sub-band of a carrier, a first downlink sub-band OFDM signal of an OFDM-based signal in a plurality of first resource blocks associated with a first subcarrier spacing; and
transmit, in a second sub-band of the carrier, a second downlink sub-band OFDM signal of the OFDM-based signal in a plurality of second resource blocks associated with a second subcarrier spacing, wherein the first subcarrier spacing is one of 30 kHz or 60 kHz, wherein the second subcarrier spacing is one of 30 kHz or 60 kHz, wherein the first downlink sub-band OFDM signal and the second downlink sub-band OFDM signal are simultaneously transmitted by the transmitter, and wherein the first subcarrier spacing is different from the second subcarrier spacing, wherein a first number of subcarriers in each of the first resource blocks having the first subcarrier spacing of 30 kHz or 60 kHz is 24, and wherein a second number of subcarriers in each of the second resource blocks is one of 3, 6, or 12.

17. The apparatus of claim 16, wherein:

the each of the first resource blocks has a first bandwidth;

the each of the second resource blocks has a second bandwidth; and the first bandwidth is an integer multiple of the second first bandwidth.

18. The apparatus of claim 16, the non-transitory memory further including instructions that, when executed by the processor, cause the transmitter to:

transmit, in a third sub-band, a third downlink sub-band OFDM signal of the OFDM-based signal in a plurality of third resource blocks associated with a third subcarrier spacing; and transmit, in a fourth sub-band, a fourth downlink sub-band OFDM signal of the OFDM-based signal in a plurality of fourth resource blocks associated with a fourth subcarrier spacing different from the third subcarrier spacing, a bandwidth of each of the first resource blocks, the second resource blocks, the third resource blocks, and the fourth resource blocks being an integer multiple of a bandwidth of every other resource block having a smaller bandwidth.

19. The apparatus of claim 18, wherein a number of subcarriers in each of the third resource blocks and the fourth resource blocks is 12.

20. The apparatus of claim 18, wherein:

the plurality of first resource blocks are a plurality of contiguous first resource blocks; and the plurality of second resource blocks are a plurality of contiguous second resource blocks.

* * * * *

UNITED STATES PATENT AND TRADEMARK OFFICE
CERTIFICATE OF CORRECTION

PATENT NO. : 11,102,775 B2
APPLICATION NO. : 14/952983
DATED : August 24, 2021
INVENTOR(S) : Toufiqul Islam et al.

It is certified that error appears in the above-identified patent and that said Letters Patent is hereby corrected as shown below:

In the Claims

Claim 9, Column 15, Lines 58-59; delete "first" between "second" and "bandwidth".

Claim 14, Column 16, Lines 22-23; delete the spacing between "of" and "a".

Claim 14, Column 16, Line 34; delete "a transmitter configured to transmit" before "receive".

Claim 17, Column 17, Lines 14-15; delete "first" between "second" and "bandwidth".

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*